(12) United States Patent
Liu et al.

(10) Patent No.: US 12,529,909 B2
(45) Date of Patent: Jan. 20, 2026

(54) METHOD OF MANUFACTURING AN OPHTHALMIC LENS

(71) Applicant: ESSILOR INTERNATIONAL, Charenton-le-Pont (FR)

(72) Inventors: Yu Liu, Singapore (SG); Jinhhao Ng, Singapore (SG); Yassine Fakhreddine, Singapore (SG); Muhammad Leman, Singapore (SG); Eric Gacoin, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 553 days.

(21) Appl. No.: 17/920,306

(22) PCT Filed: Apr. 20, 2021

(86) PCT No.: PCT/EP2021/060240
§ 371 (c)(1),
(2) Date: Oct. 20, 2022

(87) PCT Pub. No.: WO2021/214057
PCT Pub. Date: Oct. 28, 2021

(65) Prior Publication Data
US 2023/0161176 A1     May 25, 2023

(30) Foreign Application Priority Data
Apr. 21, 2020 (EP) .................................... 20305381

(51) Int. Cl.
*G02C 7/02* (2006.01)
*B29D 11/00* (2006.01)

(52) U.S. Cl.
CPC ........ *G02C 7/021* (2013.01); *B29D 11/00317* (2013.01); *B29D 11/00961* (2013.01)

(58) Field of Classification Search
CPC .............. G02C 7/021; B29D 11/00317; B29D 11/00961
(Continued)

(56) References Cited

U.S. PATENT DOCUMENTS

| 5,280,570 A | * | 1/1994 | Jordan | ................. G02C 13/003 |
| | | | | 348/E5.058 |
| 9,625,743 B2 | | 4/2017 | Levraud et al. | |

(Continued)

FOREIGN PATENT DOCUMENTS

| EP | 1 454 283 | 9/2004 | |
| EP | 1 515 179 | 3/2005 | |
| EP | 1515179 A1 * | 3/2005 | ....... B29D 11/00961 |
| EP | 3 293 566 | 3/2018 | |

(Continued)

OTHER PUBLICATIONS

International Search Report for PCT/EP2021/060240, mailed Jul. 23, 2021, 4 pages.
(Continued)

*Primary Examiner* — Sharrief I Broome
(74) *Attorney, Agent, or Firm* — NIXON & VANDERHYE

(57) ABSTRACT

Disclosed is a method of manufacturing an ophthalmic lens to be mounted into a frame, including: a step of acquiring an optical prescription for the future wearer of the ophthalmic lens and an information relative to the ophthalmic lens and/or to the future wearer and/or to the frame; a step of calculating a surfacing instruction of the ophthalmic lens, the surfacing instruction being determined SO that the ophthalmic lens once surfaced satisfies the optical prescription; and a step of surfacing during which the at least one optical face of the ophthalmic lens is surfaced according to the surfacing instruction. During the step of calculating, the surfacing instruction is calculated so that the optical face of the ophthalmic lens once surfaced includes a mark that (Continued)

results from the step of surfacing and that forms a code associated with the information.

18 Claims, 2 Drawing Sheets

(58) Field of Classification Search
USPC .................................................. 351/159.69
See application file for complete search history.

(56) References Cited

U.S. PATENT DOCUMENTS

| | | | |
|---|---|---|---|
| 2005/0073650 A1* | 4/2005 | Ito ................... | B29D 11/00961 |
| | | | 351/200 |
| 2015/0371415 A1* | 12/2015 | Qi ...................... | A61B 3/0025 |
| | | | 345/441 |
| 2016/0116762 A1* | 4/2016 | Dangelmaier ..... | G06K 7/10732 |
| | | | 235/462.42 |

FOREIGN PATENT DOCUMENTS

| | | | |
|---|---|---|---|
| EP | 3293566 A1 * | 3/2018 | ....... B29D 11/00009 |
| WO | 2018/224617 | 12/2018 | |
| WO | WO-2018224617 A1 * | 12/2018 | ............. G02C 11/10 |
| WO | 2019/003343 | 4/2020 | |

OTHER PUBLICATIONS

Written Opinion of the ISA for PCT/EP2021/060240, mailed Jul. 23, 2021, 6 pages.

* cited by examiner

Fig.4

| $\begin{bmatrix} 1 & 0 \\ 0 & 0 \end{bmatrix}$ | $\begin{bmatrix} 1 & 0 \\ 1 & 0 \end{bmatrix}$ | $\begin{bmatrix} 1 & 1 \\ 0 & 0 \end{bmatrix}$ | $\begin{bmatrix} 1 & 1 \\ 0 & 1 \end{bmatrix}$ | $\begin{bmatrix} 1 & 0 \\ 0 & 1 \end{bmatrix}$ | $\begin{bmatrix} 1 & 1 \\ 1 & 0 \end{bmatrix}$ | $\begin{bmatrix} 1 & 1 \\ 1 & 1 \end{bmatrix}$ | $\begin{bmatrix} 1 & 0 \\ 1 & 1 \end{bmatrix}$ | $\begin{bmatrix} 0 & 1 \\ 1 & 0 \end{bmatrix}$ | $\begin{bmatrix} 0 & 1 \\ 1 & 1 \end{bmatrix}$ |
|---|---|---|---|---|---|---|---|---|---|
| ●○<br>○○<br>○○ | ●○<br>●○<br>○○ | ●●<br>○○<br>○○ | ●●<br>○●<br>○○ | ●○<br>○●<br>○○ | ●●<br>●○<br>○○ | ●●<br>●●<br>○○ | ●○<br>●●<br>○○ | ○●<br>●○<br>○○ | ○●<br>●●<br>○○ |
| a/1 | b/2 | c/3 | d/4 | e/5 | f/6 | g/7 | h/8 | i/9 | j/0 |
| ●○<br>○○<br>●○ | ●○<br>●○<br>●○ | ●●<br>○○<br>●○ | ●●<br>○●<br>●○ | ●○<br>○●<br>●○ | ●●<br>●○<br>●○ | ●●<br>●●<br>●○ | ●○<br>●●<br>●○ | ○●<br>●○<br>●○ | ○●<br>●●<br>●○ |
| k | l | m | n | o | p | q | r | s | t |
| ●○<br>○○<br>●● | ●○<br>●○<br>●● | ●●<br>○○<br>●● | ●●<br>○●<br>●● | ●○<br>○●<br>●● | | | | | ○●<br>●●<br>○● |
| u | v | x | y | z | | | | | w |

METHOD OF MANUFACTURING AN OPHTHALMIC LENS

CROSS-REFERENCE TO RELATED APPLICATIONS

This application is the U.S. national phase of International Application No. PCT/EP2021/060240 filed Apr. 20, 2021, which designated the U.S. and claims priority to EP Patent Application No. 20305381.4 filed Apr. 21, 2020, the entire contents of each of which are hereby incorporated by reference.

BACKGROUND OF THE INVENTION

Field of the Invention

The invention relates to ophthalmic lenses intended to be mounted in eyeglasses frames.

More precisely the invention relates to a method of manufacturing an ophthalmic lens, to a process of inspecting an ophthalmic lens manufactured thanks to this method, and to an ophthalmic lens manufactured thanks to this method.

Description of the Related Art

Preparing an ophthalmic lens for mounting in an eyeglasses frame selected by a wearer comprises five main operations, which are the following:
  molding the ophthalmic lens to a standard shape (at the end of this operation, the lens is called "semi-finished lens"),
  machining one of the optical faces of the ophthalmic lens so that it presents an optical power equal to the desired optical power (the term "surfacing operation" is used),
  acquiring the outline of one of the rims or of one of the presentation lenses of the eyeglasses frame selected by the client (future wearer of the eyeglass frame),
  centering the lens, which consists in positioning and orienting that outline appropriately on the lens, so that once assembled, the lens will be centered relative to the pupil of the wearer's corresponding eye, and then
  edging the lens, which consists in cutting it along the centered outline so that the lens matches the shape of the selected frame both mechanically and pleasingly, while performing as well as possible the optical function for which it is designed.

It may be interesting to apply a mark onto the ophthalmic lens, for example to identify this ophthalmic lens during its manufacturing process.

Numerous documents describe devices and methods for applying such marks.

For instance, document U.S. Pat. No. 9,625,743 describes a lens having a front face onto which a QR code is directly printed. This QR code stores in digital form information useful for machining the lens along an outline that corresponds to the one of the frame. In a variant, this QR code is printed on a sticker that is stuck onto the lens.

The major drawback of this solution is that the printing of the QR code needs a specific tool (an ink pad or a printer), which is expensive and time consuming.

Besides, lenses are generally coated before being edged, for instance to have an anti-reflective film. During this coating operation, a risk is that the marks are covered by the coating so that they loose the intended function.

SUMMARY OF THE INVENTION

Therefore, one object of the invention is to provide a solution less expensive to apply marks onto lenses.

The above object is achieved according to the invention by means of a method of manufacturing an ophthalmic lens, comprising:
  a step of acquiring an optical prescription for the future wearer of the ophthalmic lens and an information relative to the ophthalmic lens and/or to said future wearer and/or to said frame,
  a step of calculating a surfacing instruction for machining at least one optical face of the ophthalmic lens, said surfacing instruction being determined so that the ophthalmic lens once surfaced satisfies said optical prescription, and
  a step of surfacing during which said at least one optical face of the ophthalmic lens is surfaced according to said surfacing instruction,
  wherein, during said step of calculating, said surfacing instruction is calculated so that said optical face of the ophthalmic lens once surfaced includes a mark that results from said step of surfacing and that forms a code associated with said information.

In other words, the marking of the lens is done during the surfacing operation, so that it does not require any additional tool, thereby reducing costs.

This solution also reduces the complexity of the operation, and do not need any additional time to be performed.

Another advantage of this solution is that the mark can be invisible to the user, so that it can be positioned inside the outline of the lens once edged, that is to say in a part of the semi-finished lens that will not be removed during the edging operation. Consequently, this mark can also be used after the manufacturing of the eyeglasses, to serve for instance as a kind of warranty.

Other advantageous characteristics of the invention are the following ones:
  said step of calculating comprising a sub-step of determining an intermediate file as a function of said optical prescription, a sub-step of coding said acquired information, and a sub-step of determining said surfacing instruction as a function of said intermediate file and of the coded information,
  the mark comprises an array of discontinuous areas, the forms of which and/or the positions of which forming said code,
  each discontinuous area is formed by a micro-lens, the optical power of which being different from the optical power of said at least one optical face of the ophthalmic lens,
  the mark comprises an array of continuous areas, the forms of which and/or the positions of which forming said code,
  the array of continuous areas stores said information in digital form,
  said information comprises one of the following elements: a lens serial number, a wearer information, for instance a wearer identification, an optical prescription, a lens optical information, a lens model, a lens manufacturer identification,
  the method comprises steps of acquiring the shape of an outline to which the ophthalmic lens is to be edged, and of centering the acquired outline relative to the ophthalmic lens, said mark being positioned inside said outline.

The invention also relates to a method of controlling an ophthalmic lens manufactured thanks to a method of manufacturing as specified hereabove, comprising steps of:
  a) capturing a raw image of at least a portion of said ophthalmic lens showing said mark, and b) processing the raw image acquired in step a) in order to decode the information associated to the code formed by said mark.

Preferably, this method comprises a step c) of authenticating the ophthalmic lens as a function of the decoded information.

The invention also relates to an ophthalmic lens comprising two optical faces and suitable to be mounted into a frame in order to be worn by a future wearer, wherein at least one of said two optical faces includes a mark that forms a code associated with an information relative to the ophthalmic lens and/or to said future wearer and/or to said frame and that results from an operation of surfacing the entire said optical face of the ophthalmic lens.

Other advantageous characteristics of the lens are the following ones:
- the mark comprises an array of discontinuous areas, the forms of which and/or the positions of which forming said code,
- each discontinuous area is formed by a micro-lens, the optical power of which being different from the optical power of said optical face of the ophthalmic lens,
- the mark comprises an array of continuous areas, the forms of which and/or the positions of which forming said code,
- the array of continuous areas stores said information in digital form.

BRIEF DESCRIPTION OF THE DRAWINGS

The following description with reference to the accompanying drawings, given by way of non-limiting example makes it clear what the invention consists in and how it can be reduced to practice.

In the Accompanying Drawings:

FIG. 4 is a correspondence table between the Alphabet code and the Braille Code.

DESCRIPTION OF THE PREFERRED EMBODIMENTS

Figure 1:
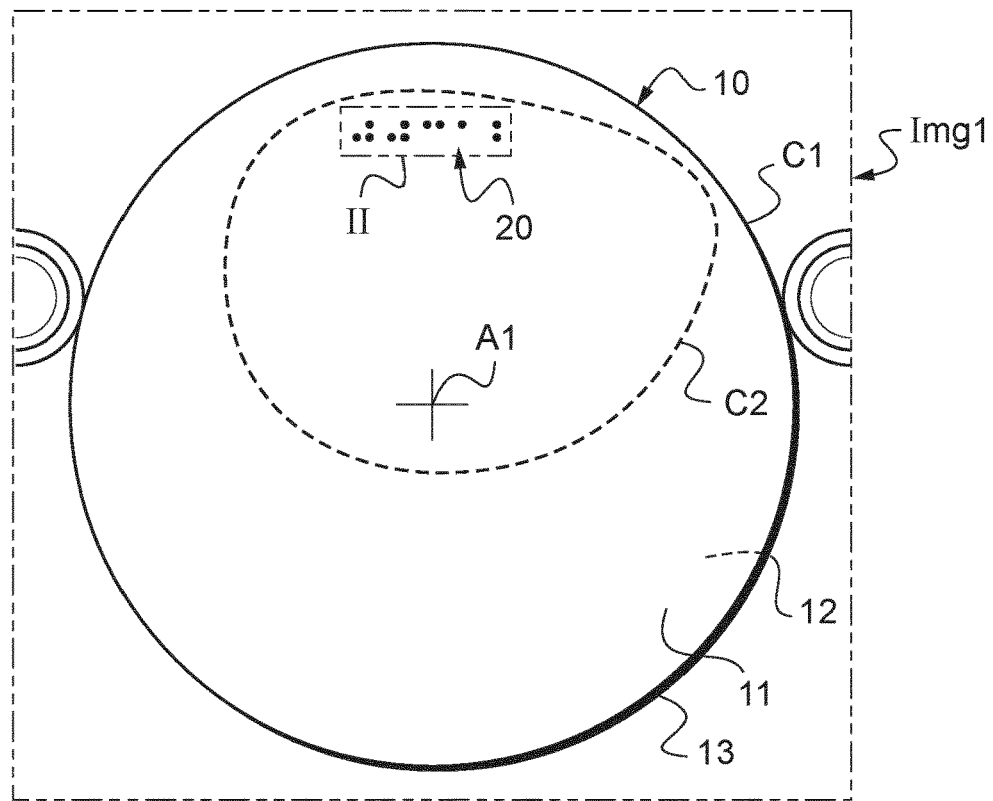
FIG. 1 is a view of an image of a surfaced lens, acquired by a photo sensor.
Figure 2:
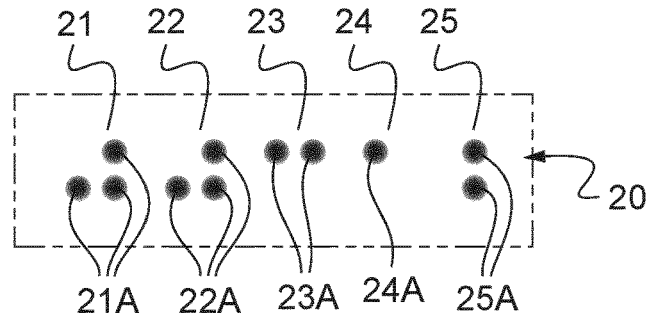
FIG. 2 is a detailed view of area II of FIG. 1.

The invention principally relates to a method of manufacturing an ophthalmic lens in such a manner that this lens fulfils an optical function for correcting an optical deficiency of a patient, the latter being the future wearer of an eyeglasses comprising a frame and said ophthalmic lens.

To sum up, this method of manufacturing comprises a first operation of acquiring the optical prescription F1 of the future wearer, said optical prescription being provided by the wearer's optometrist.

It comprises a second operation of molding a material in order to obtain a semi-finished lens. This semi-finished lens has a standard shape so that it does not present the desired optical power deduced from said optical prescription F1.

A third operation consists in machining at least one of the optical faces of the semi-finished lens with machining tools so that the latter presents an optical power equal to the desired optical power. This operation is called "surfacing operation". At this step, the surfaced lens 10 comprises two optical faces 11, 12 and an edge 13 having a circular outline C1 around a main axis A1 (see FIG. 1).

A fourth operation is to machine the edge of the lens so that the edged lens has an outline C2 that matches the shape of the corresponding frame rim. This operation consists in acquiring the shape of the frame rim outline, positioning this outline C2 in the frame of reference of the lens, and cutting out the lens along this outline C2.

Then, during the last operation, the edged lens and the frame are assembled to form a pair of eyeglasses.

The instant invention principally relates to the third operation.

This operation can be operated by means of a digitally controlled free-form surfacing machine, the expression "digitally controlled" designating all of the hardware and software acting to provide movement instructions to all the components of the surfacing machine.

Such a surfacing machine is well known from the one skilled.

We can only explain that such a machine generally includes a spindle bearing a surfacing tool, a support holding the semi-finished lens, a calculating and control-command unit (called herein after "calculating unit") provided with a data-processing system comprising a microprocessor equipped with a memory allowing it to load and store a software package (also called a computer program) that, when it is executed in the microprocessor, allows the manufacturing method to be implemented.

According to the invention, the manufacturing method comprises not only the acquisition of the optical prescription F1 for the future wearer of the ophthalmic lens but also the acquisition of an information F2.

This information F2 relates to the ophthalmic lens and/or to the future wearer and/or to the frame. The aim of this acquisition is to memorize this information F2 onto the lens, thanks to a mark 20 machined onto the lens during the surfacing operation (i.e. by means of the surfacing tool).

This information F2 can comprise one or several data. For instance, it can comprise one or several of the following data:
- a lens serial number,
- a wearer information (a wearer identification, an age, a lens wearing history . . . )
- the optical prescription F1,
- a lens optical characteristic (material, optical index . . . ),
- a lens model,
- a lens batch identification (when the lenses of similar forms are processed by batches),
- a lens manufacturer identification . . . .

In the following example, the information F2 only comprises a lens serial number. This lens serial number, here "00312", comprises five digits.

On the basis of the base curve of the semi-finished lens, the prescription F1, and the information F2, the calculating unit performs a step of calculating a surfacing instruction F4 for machining at least one of the optical faces 11 of the ophthalmic lens 10.

We can consider here that only, the front face 11 is to be machined. But in a variant, only the rear face may be machined. In another variant, both faces maybe machined.

In the non-limiting example here disclosed, this step of calculating comprises three sub-steps.

The first sub-step consists in determining an intermediate file F3 as a function of said optical prescription F1, considering the base curve of the semi-finished lens.

This intermediate file F3 is calculated according to a well-known method in such a manner that, if the lens was machined by means of this file, it would present a shape enabling it to perform the optical function for which it is designed.

Then, this intermediate file F3 is completed.

To this end, during a second sub-step, the information F2 is coded.

In our example, the information F2 is coded by using the Braille code.

The correspondence table between each Alphabet letter and each associated code is represented in FIG. 4. According to this Braille code, each letter can be coded by means of six points and each digit can be coded by means of four points.

In our example, the information F2 is made up of five digits. Consequently, each digit is coded in our example with four points distributed to the corners of a square. As shown in FIG. 4, each point can be mathematically represented by a coefficient "1" of a 2-2 matrix (the absence of point being represented by a null coefficient).

In a variant and in a more general manner, we may use 2-3 matrixes to represent the points coding either a letter or a digit.

Figure 3:
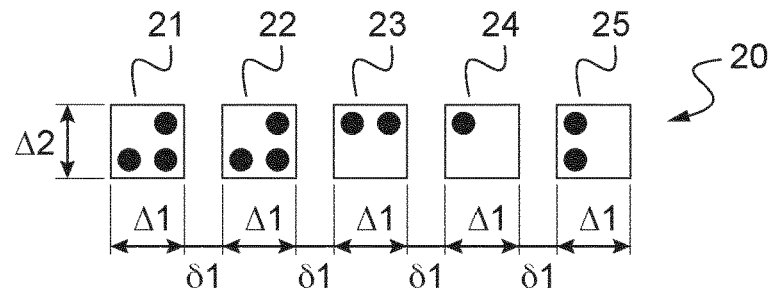
FIG. 3 is a view homologous of the one represented on FIG. 3.

In our example, to simplify, we can consider that, to code the information F2, the calculating unit generates five 2-2 matrixes and deduced therefrom an image as shown in FIG. 3, comprising five assemblies 21-25 of one or two or three or four points, each associated to one of said 2-2 matrixes.

Each assembly is distributed into a rectangle of height Δ2=1.7 mm and of width Δ1=1.1 mm, two adjacent assemblies being distant from each other of δ1=0.5 mm.

These assemblies form an image, called "mark 20" once machined onto the front face 11 of the lens.

Finally, the third sub-step consists in determining the surfacing instruction F4 as a function of the intermediate file F3 and of the coded information. More specifically, the said image is incrusted into the intermediate file F3 so that, once surfaced, the lens includes the mark 20.

In other words, the surfacing instruction F4 is calculated so that said optical face 11 of the ophthalmic lens 10, once surfaced, includes a mark 20 that results from said step of surfacing and that forms a code associated with said information F2.

Then, the last step consists in surfacing the optical face 11 of the ophthalmic lens 10 according to this surfacing instruction F4.

After, the surfacing instruction F4 is feed into the surfacing machine and the front face 11 of the lens is machined according to this instruction F4.

The mark 20 is shaped on the front face 11 of the lens, at the same time as the remainder of the front face 11, thanks to the same tool.

In the variant according to which only the rear face is surfaced, the mark 20 is of course machined on this rear face.

In the other variant according to which both faces are surfaced, the mark 20 can be machined on either face of the lens, or on both faces.

The mark 20 can be of any shaped, at the condition that the embedded code can be decoded with a decoding device.

In FIG. 1, a first embodiment is represented. In this embodiment, the mark 20 comprises an array of discontinuous areas, the forms of which and/or the positions of which forming said code.

Each discontinuous area presents, along its outline, a discontinuity in terms of heights of points of the front face 11 (the heights being measured along the main axis A1): when observing a section of the front face in a plane that comprises the main axis A1 and that passes by the center of one of the discontinuous area, the representative curve of the front face 11 in this plane presents an angular point on each side of the discontinuous area.

In other words, a discontinuous area can be defined as an area bordered by an edge (here circular) or as an area at the contour of which the optical power of the lens varies in a discontinuous manner.

In the example shown in the Figures, each discontinuous area is formed by a micro-lens 21A-25A.

Each micro-lens 21A-25A has a circular outline but in a variant, this outline may be in square, oval or other shapes.

Each micro-lens 21A-25A comprises an optical power that is different from the optical power of the annular zone of the front face 11 that surrounds it (which generates the discontinuity).

The power of the micro-lens needs to be sufficiently small so that the difference in optical power with the annular zone is not noticeable to the future wearer when wearing the lens, yet at the same time, the difference has to be large enough to be detectable by the decoding device.

The difference between the optical power of each micro-lens and the optical power of the corresponding annular zone is preferably higher, in absolute value, than 1.5 diopter. In a variant, if the apparatus for decoding the mark 20 is able to perform very accurate measures, a difference fewer than 1.5 diopter can be used.

In another embodiment not represented in the Figures, the mark 20 may comprise an array of continuous areas, the forms of which and/or the positions of which forming said code.

We can give an example. In this example, a zone of the front face 11 of the lens comprises variations of optical powers that are continuous. These variations are greater than in the remainder of the lens. In this zone, the optical power presents high levels and low levels. The high levels can correspond to the black squares of a QR code (or to the lines of a bar code) and the low levels can be associated to the white squares of the QR code. In our example, the levels are distant from each other of 0.1 mm.

In this example, the array of continuous areas stores the information F2 in digital form in the sense in that this QR code is associated to a binary code that can be used to memorize the information F2, or to an identifier associated to this information. For instance, the QR code can memorize the address of a database record in which the information F2 is memorized.

Preferably, in both embodiments, the mark 20 is positioned inside the outline C2.

Thanks to this characteristic, the mark 20 remains on the lens 10 after the edging operation, so that the information F2 remains accessible not only for the edging operation, but also for the mounting of the lens into the frame rim and for after-sale.

In order not to be uncomfortable for the wearer, the mark 20 is positioned in an upper part of the lens.

For this reason, it is positioned at a distance of the outline C2 that is fewer than 50% of the minimum distance between the geometric center of the outline and the outline C2. This geometric center (also called "boxing center") is defined here as the center of the horizontal rectangle in which the outline C2 is circumscribed.

At this step of the manufacturing process, the ophthalmic lens 10 includes a mark 20 that forms a code associated with the information F2 and that results from the operation of surfacing the entire front face 11.

Thanks to this manufacturing process, the mark 20 is not visible by the wearer when the latter wears his eyeglasses.

But this mark 20 has to be visible for a user (for instance the optician) who wants to obtain the information F2.

To read the mark 20, the user can use either a specific optical device or a nonspecific device fitted with a photo sensor.

A specific optical device can be, for instance, a preparation apparatus as disclosed in document US2010228375. Indeed, this apparatus includes a photo sensor and an image processing unit suitable to detect the mark 20.

A nonspecific device can be a mobile telecommunication apparatus, for instance a portable desktop, a mobile phone or a tablet, that comprises a photo sensor and an image processing unit.

In both embodiments, the image processing unit has to be programmed so as to be adapted to decode the information F2.

More precisely, the image processing unit must be programmed to perform a method of controlling the ophthalmic lens 10, by implementing a first step of acquiring (by means of the photo sensor) a raw image Img1 of at least a portion of said ophthalmic lens 10 showing said mark 20 (see FIG. 1), and a second step of processing this raw image Img1 in order to decode the information F2 associated to the Braille code formed by said mark 20.

The second step comprises sub-steps consisting in:
detecting the position of the outline of each micro-lens 21A-25A,
identifying the assemblies 21-25 of micro-lenses, each of which being associated to a digit according to the Braille code,
determining, for each assembly, the number and the positions of the micro-lenses,
generating a binary matrix, the coefficients of which being equal to 1 if the associated assembly comprises a micro-lens in the corresponding position and to 0 in the opposite case,
reading in the Table of FIG. 4 the digit associated to this matrix,
deducing therefrom the information F2.

The information F2, once decoded, can be used in various ways.

For instance, if the information F2 comprises the shape of the outline C2, this information can be used for the edging process, in order to cut-out the surfaced lens along this outline C2.

In another example, the information F2 can be used during a third step of authenticating the ophthalmic lens 10 in an after-sales service.

More specifically, the user can verify that the lenses of an eyeglasses are authentic, by scanning with a mobile phone the mark 20 and by sending the information F2 read to a central server that will send him in response a message informing him whether the lens is authentic or not. In this example, the encoded serial number serves as a warranty number. As such, the wearer does not need to worry about the loss of a warranty card.

We note that preferably, the mark is done on the semi-finished lens, before edging the lens along a final outline, and preferably before applying any treatment on the lens. Consequently, the mark is done on the monobloc core of the lens.

The invention claimed is:

1. A method of manufacturing an ophthalmic lens to be mounted into a frame, the method comprising:
acquiring an optical prescription for a future wearer of the ophthalmic lens and an information relative to one or more of: (i) the ophthalmic lens, (ii) said future wearer, and (iii) said frame;
molding a semi-finished lens;
calculating a surfacing instruction for machining at least one optical face of the molded semi-finished lens by a processor executing computer-readable instructions stored in memory, said surfacing instruction being determined so that the ophthalmic lens once surfaced satisfies said acquired optical prescription, said surfacing instruction being calculated so that said at least one optical face of the ophthalmic lens once surfaced includes a mark that results from surfacing, the mark forming a code associated with said information, said mark being shaped at the same time as the remainder of said at least one optical face, due to a same tool; and
manufacturing the ophthalmic lens by a surfacing machine, by surfacing said at least one optical face of the semi-finished lens according to said calculated surfacing instruction to form the mark.

2. The method of manufacturing according to claim 1, wherein said calculating comprises determining an intermediate file as a function of said optical prescription, coding said acquired information, and determining said surfacing instruction as a function of said determined intermediate file and the coded information.

3. The method of manufacturing according to claim 1, wherein the mark comprises an array of discontinuous areas, the forms of the discontinuous areas or the positions of the discontinuous areas forming said code.

4. The method of manufacturing according to claim 3, wherein each discontinuous area is formed by a micro-lens, the optical power of the micro-lens being different from the optical power of said at least one optical face of the ophthalmic lens.

5. The method of manufacturing according to claim 1, wherein the mark comprises an array of continuous areas, the forms of the continuous areas or the positions of the continuous areas forming said code.

6. The method of manufacturing according to claim 5, wherein the array of continuous areas stores said information in digital form.

7. The method of manufacturing according to claim 1, wherein said information comprises one of:
a lens serial number,
a wearer information,
the optical prescription,
a lens optical information,
a lens model, and
a lens manufacturer identification.

8. The method of manufacturing according to claim 1, further comprising:
acquiring the shape of an outline to which the ophthalmic lens is to be edged; and
centering the acquired outline relative to the ophthalmic lens, and
wherein said mark is positioned inside said outline.

9. A method of controlling the ophthalmic lens manufactured by the method of manufacturing according to claim 1, the method of controlling comprising:
capturing a raw image of at least a portion of said ophthalmic lens showing said mark; and
processing the captured raw image to decode the information associated to the code formed by said mark.

10. The method of controlling according to claim 9, further comprising authenticating the ophthalmic lens as a function of the decoded information.

11. An ophthalmic lens configured to be mounted into a frame in order to be worn by a future wearer, the ophthalmic lens comprising:
two optical faces, at least one of said two optical faces including a mark that forms a code associated with an information relative to one of: (i) the ophthalmic lens, (ii) said future wearer, and (iii) said frame and that results from an operation of surfacing the entire optical face of the ophthalmic lens by a surfacing machine and a processor executing computer-readable instructions stored in memory.

12. The ophthalmic lens according to claim 11, wherein the mark comprises an array of discontinuous areas, the forms of the discontinuous areas or the positions of the discontinuous areas forming said code.

13. The ophthalmic lens according to claim 12, wherein each discontinuous area is formed by a micro-lens, the optical power of the micro-lens being different from the optical power of said at least one optical face of the ophthalmic lens.

14. The ophthalmic lens according to claim 11, wherein the mark comprises an array of continuous areas, the forms of the continuous areas or the positions of the continuous areas forming said code.

15. The ophthalmic lens according to claim 14, wherein the array of continuous areas stores said information in digital form.

16. The method of manufacturing according to claim 2, wherein the mark comprises an array of discontinuous areas, the forms of the discontinuous areas or the positions of the discontinuous areas forming said code.

17. The method of manufacturing according to claim 2, wherein the mark comprises an array of continuous areas, the forms of the continuous areas or the positions of the continuous areas forming said code.

18. The method of manufacturing according to claim 2, wherein said information comprises one of:
a lens serial number,
a wearer information,
the optical prescription,
a lens optical information,
a lens model, and
a lens manufacturer identification.

* * * * *